United States Patent
Verma et al.

(10) Patent No.: US 7,728,833 B2
(45) Date of Patent: Jun. 1, 2010

(54) METHOD FOR GENERATING A THREE-DIMENSIONAL MODEL OF A ROOF STRUCTURE

(75) Inventors: Vivek Verma, Lawrenceville, NJ (US); Rakesh Kumar, Monmouth Junction, NJ (US); Stephen Charles Hsu, Sunnyvale, CA (US); Harpreet Sawhney, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1 day.

(21) Appl. No.: 11/206,665

(22) Filed: Aug. 18, 2005

(65) Prior Publication Data

US 2006/0061566 A1 Mar. 23, 2006

Related U.S. Application Data

(60) Provisional application No. 60/602,354, filed on Aug. 18, 2004, provisional application No. 60/693,718, filed on Jun. 24, 2005.

(51) Int. Cl.
G06T 17/00 (2006.01)

(52) U.S. Cl. .................................................. 345/420

(58) Field of Classification Search ................ 345/419, 345/420, 582; 382/154; 702/150–155
See application file for complete search history.

(56) References Cited

U.S. PATENT DOCUMENTS

| | | | |
|---|---|---|---|
| 4,625,289 A * | 11/1986 | Rockwood | 345/422 |
| 5,233,541 A * | 8/1993 | Corwin et al. | 348/81 |
| 6,473,079 B1 | 10/2002 | Kacyra et al. | |
| 6,654,690 B2 * | 11/2003 | Rahmes et al. | 702/5 |
| 7,398,481 B2 * | 7/2008 | Kraus et al. | 715/848 |
| 2002/0041327 A1 * | 4/2002 | Hildreth et al. | 348/42 |
| 2004/0041805 A1 * | 3/2004 | Hayano et al. | 345/419 |
| 2004/0051711 A1 * | 3/2004 | Dimsdale et al. | 345/419 |
| 2004/0109012 A1 * | 6/2004 | Kraus et al. | 345/700 |
| 2004/0217956 A1 * | 11/2004 | Besl et al. | 345/419 |
| 2005/0117215 A1 * | 6/2005 | Lange | 359/462 |
| 2005/0128197 A1 * | 6/2005 | Thrun et al. | 345/421 |
| 2005/0140670 A1 * | 6/2005 | Wu et al. | 345/419 |
| 2005/0168460 A1 * | 8/2005 | Razdan et al. | 345/419 |
| 2006/0006309 A1 * | 1/2006 | Dimsdale et al. | 250/206.1 |

OTHER PUBLICATIONS

"The Ball-Pivoting Algorithm for Surface Reconstruction"; Bernardini et al.; IEEE Transactions on Visualization and Computer Graphics, vol. 5, No. 4, Oct.-Dec. 1999; pp. 349-359.*

(Continued)

Primary Examiner—Jason M Repko
(74) Attorney, Agent, or Firm—Lowenstein Sandler PC

(57) ABSTRACT

A method and apparatus for automatically generating a three-dimensional computer model from a "point cloud" of a scene produced by a laser radar (LIDAR) system. Given a point cloud of an indoor or outdoor scene, the method extracts certain structures from the imaged scene, i.e., ceiling, floor, furniture, rooftops, ground, and the like, and models these structures with planes and/or prismatic structures to achieve a three-dimensional computer model of the scene. The method may then add photographic and/or synthetic texturing to the model to achieve a realistic model.

7 Claims, 8 Drawing Sheets

OTHER PUBLICATIONS

Pauly, Mark; Gross, Markus; Kobbelt, Leif P.; "Efficient Simplification of Point-Sampled Surfaces;" Oct. 27,-Nov. 1, 2002; IEEE Visualization; pp. 163-170.*

Forlani et al.; "Building Reconstruction and Visualization from LIDAR Data;" 2003; The International Archives of the Photogrammetry, Remote Sensing and Spatial Information Sciences; vol. 34; pp. 151-156.*

Rottensteiner et al.; "Detecting Buildings and Roof Segments by Combining LIDAR Data and Multispectral Images;" Jan. 1, 2003; Image and Vision Computing New Zealand 2003; pp. 1-6.*

Claus Brenner, "Modelling 3d Objects Using Weak Csg Primitives," Jul. 12, 2004, International Archives of Photogrammetry, Remote Sensing and Spatial Information Sciences 35(3), pp. 1085-1090.*

Armin Gruen, Xinhua Wang, "CC-Modeler: a topology generator for 3-D city models," Sep. 7, 1998, ISPRS Journal of Photogrammetry & Remote Sensing 53, pp. 286-295.*

* cited by examiner

METHOD FOR GENERATING A THREE-DIMENSIONAL MODEL OF A ROOF STRUCTURE

CROSS-REFERENCE TO RELATED APPLICATIONS

This application claims benefit to U.S. provisional patent application Ser. No. 60/602,354, filed Aug. 18, 2004, and U.S. provisional patent application Ser. No. 60/693,718, filed Jun. 24, 2005, which are both herein incorporated by reference.

GOVERNMENT RIGHTS IN THIS INVENTION

This invention was made with U.S. government support under contract number N61339-03-C-0090. The U.S. government has certain rights in this invention.

BACKGROUND OF THE INVENTION

1. Field of the Invention

Embodiments of the present invention generally relate to image processing systems and, more particularly, to a method and apparatus for creating three-dimensional models of scenes.

2. Description of the Related Art

The past decade has witnessed the emergence of three-dimensional graphics technology applied to various applications in commercial, military, and entertainment areas. This is been possible due to the advances in computing power, maturity of graphics hardware and algorithms, as well as improvements in sensors and devices such as digital cameras, displays and the like. Laser radar (LIDAR) is one such sensor that provides three-dimensional information regarding a scene. LIDAR is increasingly becoming the modality of choice to obtain three-dimensional information for outdoor as well as indoor scenes. For example, in an outdoor application, an aerially deployed LIDAR system can be used to rapidly collect three-dimensional data from above an urban area that is to be modeled. In an indoor application, a room or rooms can be scanned by a LIDAR system such that a model of the room and the contents of the room can be created.

Traditionally, geometrically and visually accurate site models of buildings and urban environments are constructed using manual techniques. All conventional, real-time, three-dimensional graphics pipelines are designed to render textured triangulated models, in which the shape and appearance of a scene are represented by a collection of three-dimensional triangular facets, each bearing a digital image of a surface. Currently, constructing such models from images alone is a labor intensive process involving skilled photogrammetrists and graphic artists. Thus, the process of generating a three-dimensional scene from a known image is labor intensive and costly.

Therefore, there is a need in the art from method and apparatus of automatically generating a three-dimensional model of a scene.

SUMMARY OF THE INVENTION

The present invention generally is a method and apparatus for automatically generating a three-dimensional computer model from a "point cloud" of a scene produced by a laser radar (LIDAR) system. Given a point cloud of an indoor or outdoor scene, the method extracts certain structures from the imaged scene, i.e., ceiling, floor, furniture, rooftops, ground, trees, vehicles, and the like, to determine a three-dimensional geometry of the scene and then models the scene and its structures to achieve a complete three-dimensional computer model of the scene. The method may then add photographic and/or synthetic texturing to the model to achieve a realistic model.

More specifically, in the outdoor scene modeling process where the point cloud is representative of an aerial view of, for example, an urban environment, the point cloud is processed to extract building rooftop information and ground information. The rooftop information is then further processed to understand the topography of the roofs and generate roof models. These roof models are extruded to the ground to generate a building model within the scene. Texture is applied to the ground and to the buildings to create a realistic three-dimensional model of an outdoor scene.

A similar process is performed to point clouds that are representative of indoor spaces to model a room and its contents (e.g., furniture). Specifically, the point cloud is processed to determine the ceiling and floor planes. The points in the point cloud that lie in the ceiling and floor planes are removed from the point cloud and the remaining points are processed to determine planar structures that define the furniture and other objects within the room. These structures are extruded to the floor plane to create furniture models. Texture can then be added to the planes to achieve a realistic, three-dimensional model of the indoor scene.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for automatically producing three-dimensional models of a scene.

The source of data from which the model is created is a LIDAR point cloud produced by a LIDAR system.

Figures 1, 2:
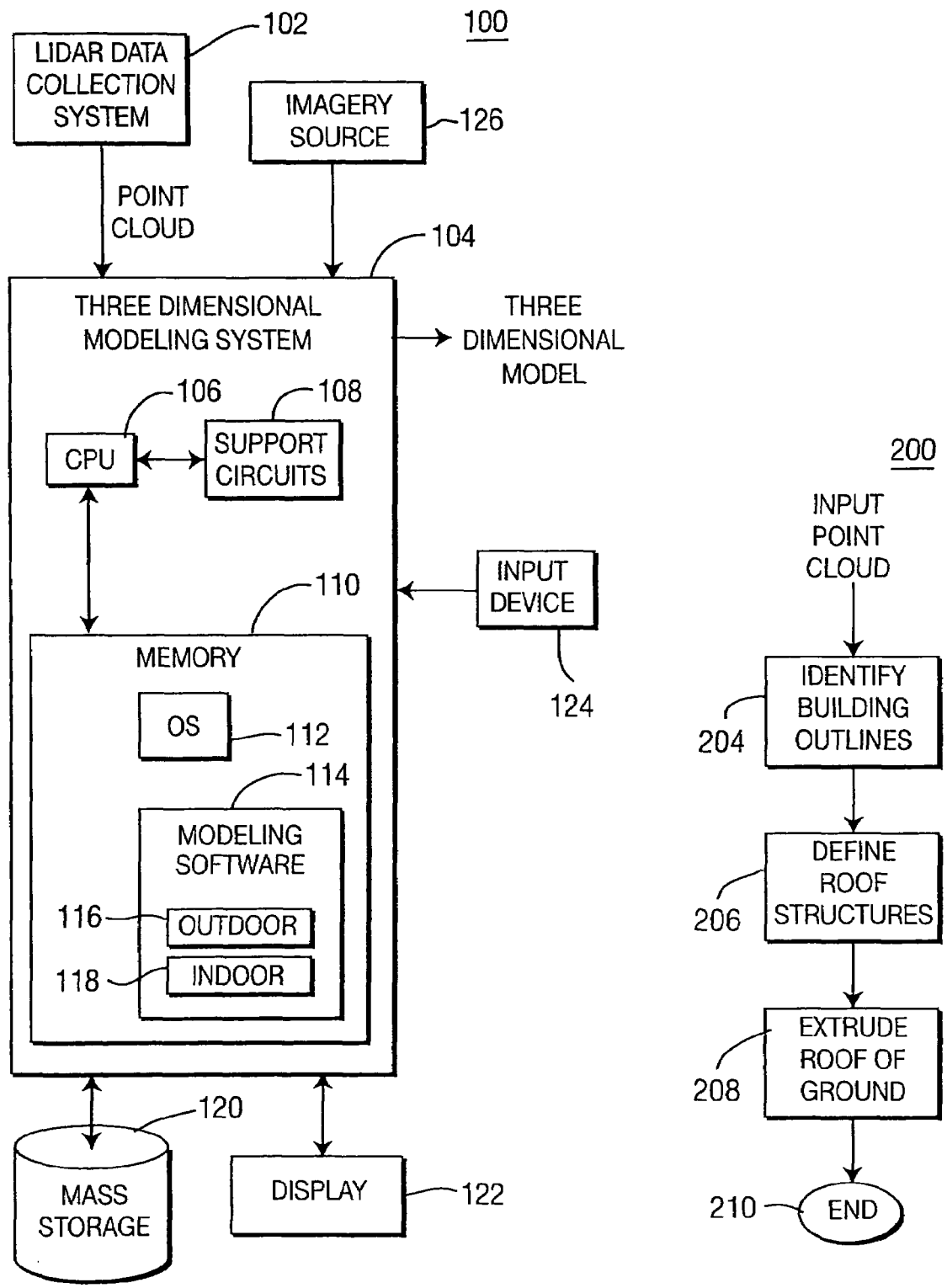
FIG. 1 depicts a block diagram of a three-dimensional modeling system in accordance with the present invention.
FIG. 2 depicts a flow diagram of a method of generating a three-dimensional model of a building or buildings within an outdoor scene.

FIG. 1 depicts a block diagram of a system 100 comprising a LIDAR data collection system 102 and a three-dimensional modeling system 104. The LIDAR data collection system 102 is a commercially available LIDAR system that scans a scene and produces a point cloud representation of the scene. Each point within the point cloud represents an (x,y) coordinate and a depth from the LIDAR unit. Alternatively, a polar coordinate system may be used having a point defined by azimuth and elevation angles and a depth relative to the LIDAR unit.

The three-dimensional modeling system 104 is coupled to a variety of support components including a mass storage unit 120 for storing data, a display 122 for displaying information to a user 122, an imagery source 126 for providing images for texturing the model and an input device 124 for enabling a user to control the system 104. The modeling system 104 processes the LIDAR point cloud to produce a three-dimensional computer model of a scene that was imaged by the LIDAR unit.

The three-dimensional modeling system 104 comprises a central processing unit (CPU) 106, support circuits 108, and a memory 110. The CPU 106 generally comprises one or more available microcontrollers and or microprocessors. The support circuits 108 support the operation of the CPU and comprise such circuits as clock circuits, cache, input/output circuitry, power supplies, and the like. The memory 110 may be random access memory, read only memory, optical storage, disk drives, or any combination thereof. The memory typically stores an operating system (OS) 112 that is used to control the computer that forms the three-dimensional modeling system 104. The operating system may be one of any conventionally available operating systems including, for example, LINUX, WINDOWS, SOLARIS, and the like. The memory 110 also comprises modeling software 114 that, when executed by the CPU 106, causes a conventional computer to operate as the three-dimensional modeling system 104. The modeling software 114 contains two components, one component 116 for performing outdoor scene modeling and one component 118 for performing indoor scene modeling.

Figure 9:
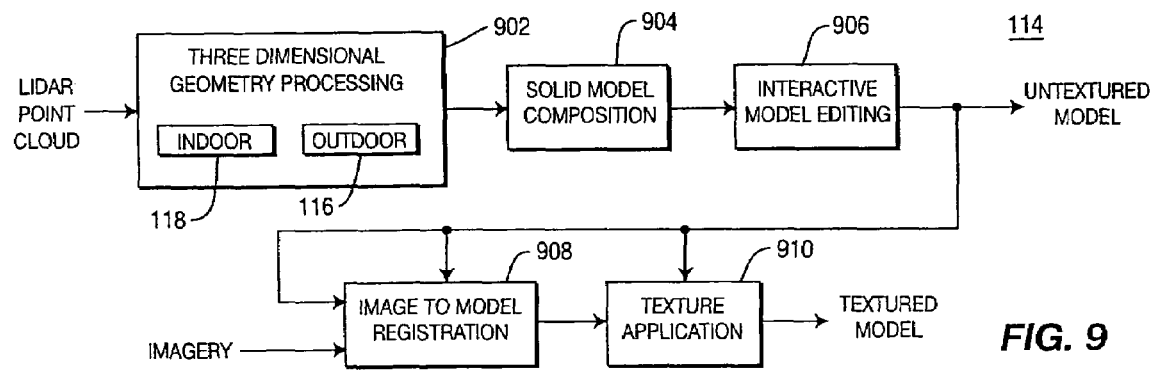
FIG. 9 depicts a functional block diagram of the modeling software that is executed to create a three-dimensional model from a LIDAR point cloud and imagery for the scene.

FIG. 9 depicts a functional block diagram of the modeling software 114. The LIDAR point cloud (or a portion thereof) is applied to a three-dimensional geometry processing module 902 that creates a geometric model directly from the point cloud. A solid model composition module 904 applies solid modeling processes to remove "inner" attributes and structures of the modeled objects within the scene, i.e., objects such as buildings are modeled as geometric shapes with planar sides, roofs, and the like. The interactive model editing module 906 allows a user to edit the model to fit the point cloud data and/or remove any anomalous attributes of the model. In one embodiment, the module 906 overlays the model as a translucent image upon the original point cloud and a user may alter the model to better fit the point cloud. The output of the module 906 is an untextured geometric model of the scene.

An image-to-model registration module 908 registers imagery (e.g., photographic, synthetic, geo-registered, and the like) to the model. The texture application module 910 applies the registered images to the model to create a textured model that resembles reality.

The modeling software 119 can be used for modeling any scene that is represented by at least one LIDAR point cloud, e.g., indoor scenes or outdoor scenes. The three-dimensional geometry processing module 902 operates slightly differently when processing point clouds representing indoor scenes as compared to point clouds representing outdoor scenes. These differences in processing are represented by the indoor component 118 and outdoor component 116. The processes used by each component are described separately below.

Outdoor Modeling Component 116

Given LIDAR point cloud data for an outdoor scene viewed from the air (e.g., an urban area), the invention automatically classifies objects within the scene, extracts buildings for processing and processes the data to define roof structures that can be represented with significantly less storage than the LIDAR datasets.

Figure 10:
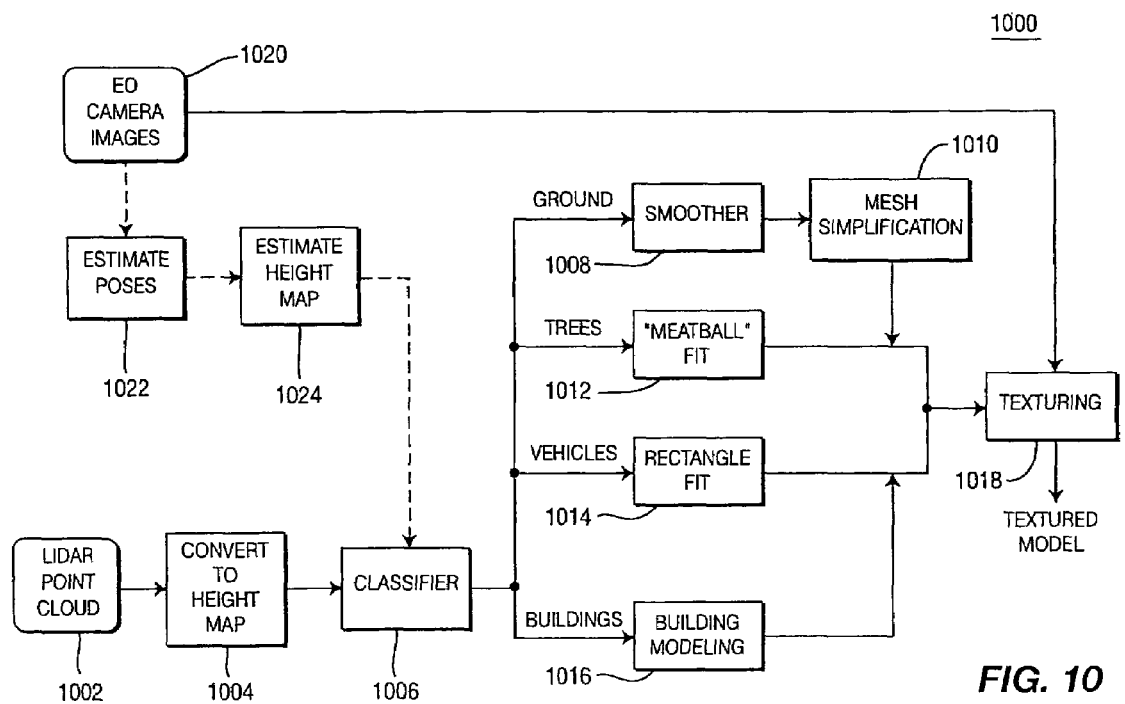
FIG. 10 depicts a block diagram of a method of generating a three-dimensional model of an outdoor scene from a LIDAR point cloud and imagery for the scene.

FIG. 10 depicts a flow diagram of a method 1000 of operation of the outdoor modeling component 116 of the three-dimensional modeling system 104 of FIG. 1. The method 1000 has as an input a LIDAR point cloud 1002. At step 1004, the LIDAR point cloud is converted to a height map using a well-known process. The height map is supplied to step 1006, where the height map is processed to classify the objects within the height map. As discussed in detail below, the classified objects are objects within the scene such as the ground, trees, vehicles, and the buildings. Other objects may be classified and extracted for processing.

The point cloud points representing each of the objects are processed to create a geometric model that represents the object. The point cloud points that represent the ground are smoothed (step 1008) and, at step 1010, a mesh is used to represent the ground. At step 1014, the points that represent trees are fitted with "meatballs" and, at step 1014, the points that represent vehicles are fitted with rectangular boxes. At step 1016, the buildings are separately modeled using the process described below with respect to FIG. 2. The resulting building model comprises a prismatic roof and extruded sidewalls that extend from the roof edges to ground. At step 1018, the model comprising the ground, trees, vehicles, and buildings is textured to create a realistic model. The result is a three-dimensional, computer generated, synthetic scene that can be manipulated by a user. Such scenes can be used in video games and other applications where a synthetic view of an urban environment is used.

The electro-optical (EO) camera images 1020 may be used to enhance the model. The imagery can be used to texture the model as well as assisting in the object classification process. The pose of the camera (camera view) can be derived from the images at step 1022. At step 1024, a height map can be extracted from the images and used for object recognition. Such object recognition can be use to identify points within the bounds of certain objects within the scene; thus, enhancing the operation of the classification process of step 1006.

FIG. 2 depicts a method 200 of operation of the building modeling step 1016 of FIG. 10. At step 204, the point cloud is analyzed to identify an outline of the buildings within the scene. The method 200 may define this outline using a number of different techniques.

In a first technique, a conventional edge detection process can be employed to determine the edges that are defined by the point cloud. The point cloud can be thought of as a height field and hence be rendered as a two-dimensional image using an appropriate mapping to map height value to color. Since the points are not arranged on a regular grid, the height field would need to be sampled on a regular grid in order to render it as a two-dimensional image. Any suitable interpolation and extrapolation method can be used to achieve this result. This two-dimensional image can be used for determining the edge of the roof structures present in the scene.

In a second technique, a two-dimensional drawing interface can be used to manually draw the outlines of the various roof structures present in the scene.

Once the building outlines are defined, the method 200 defines the roof structures. In a first technique, the roof can be defined by one or more independent planes that are manipulated into alignment. For example, a plane is fit to "flat" regions represented by the point cloud. The analysis of the point cloud in step 204 revealed the outlines of the roofs. The roof outlines are represented as polygons. An edge of one of the polygons is selected and a plane is "attached" to the selected edge. The plane is rotated about the edge until the distance between the point cloud points in the region near the edge and the plane is minimized. The parameters used in this minimization are the height of the edge and the angle of the plane passing through the edge that is free to rotate about the edge. Such a minimization technique provides a best fit for the plane to the data in that region. A well-known RANSAC (RANdom SAmple Consensus) algorithm is used to best fit the plane to the data. This process is repeated for each edge belonging to all roof outlines in the scene. Thereafter, the planes are manipulated into alignment along their butting edges such that gable roofs and other more complex roof structures are formed.

In another technique, the roof structures are modeled as parametric shapes (e.g., prismatic shapes) that are fit directly to the point cloud. Using such a technique simplifies the rooftop modeling process and mitigates the processing used to align the abutting edges of the roof region planes that was used in the foregoing technique. The method (as further discussed with respect to FIG. 3 below) determines which parametric shape has the best fit to the data representing a particular rooftop and uses that shape for the roof structure. As such, the point cloud data that represents a gable roof is quickly processed as a region and a gable rooftop shape is found that fits the data. The process for selecting the parametric shapes is disclosed in detail below with respect to FIG. 3.

Once the roof structures are determined, at step 208, the method 200 extrudes the edge of each roof structure to a reference plane, e.g., the ground plane. This extruded portion defines the sides of the building without having any imagery or LIDAR data representing the building sides. The method 200 ends at step 210. Although the illustrative embodiment of the invention models an urban outdoor scene, those skilled in the art will realize that the process of extracting outlines and fitting planes to the outlined LIDAR point cloud can be used in many other applications to produce computer models of scenes. Furthermore, the use of parametric shapes to model rooftops can be extended to utilizing parametric shapes to model other objects within a scene including automobiles, trees, water towers, and any other structure that may be contained in a point cloud of a scene.

Figure 3:
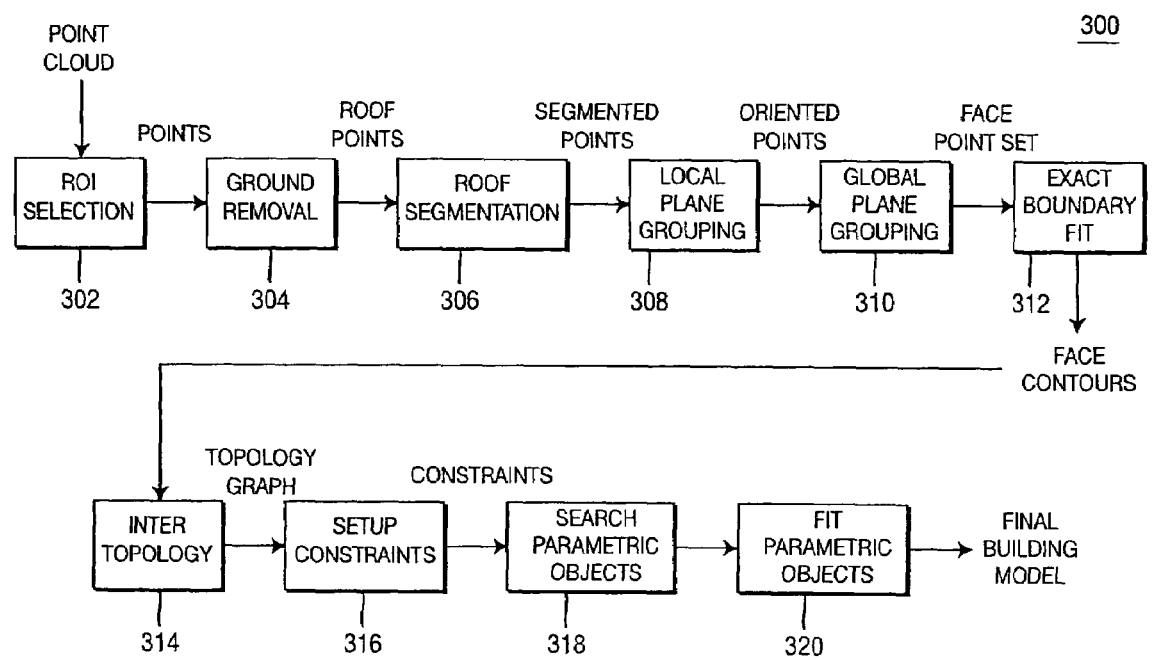
FIG. 3 depicts a flow diagram of a method of using parametric shapes to model a scene.

FIG. 3 depicts a flow diagram for a method 300 of creating a three-dimensional computer model of an outdoor scene using parametric shapes to define the rooftops of buildings within the scene. These shapes are prismatic objects that are fit to the LIDAR data.

The method 300 has as its input a point cloud from a LIDAR scanning system. At step 302, a user selects a region of interest (ROI) within the scene that is to be modeled. This selection could be automated such that a point cloud is processed in segments (i.e., tiles) along a grid, or an automated system may select an ROI based on the content of the point cloud.

At step 304, the "ground" is removed from the model. The first step in ground removal is to identify all points that are not locally planar. A point is considered locally planar if the points in the neighborhood of that point lie on a plane. This determination is accomplished by computing the covariance matrix using the points in the neighborhood of the given point and checking whether the dominant eigenvectors define a planar region. If the eigenvectors do not define a planar region then the point is considered to be non-planar and can be removed. The non-planar points are typically points that lie on non-planar structures like trees. A 3D connected components algorithm is used to group the remaining points such that points in each group are within a threshold distance from at least one other point in the same group. No two points that belong to separate groups should be within the threshold distance. The group with the largest number of points is typically the group of points that belong to the ground and are removed from the point cloud.

At step 306, the point cloud (without ground) is analyzed to identify what is thought to be the roof of any buildings within the point cloud. The estimated roof regions are segmented from the remaining data. Since step 304 removed points that are in the ground plane, objects that are part of a scene, yet not part of the buildings will remain in the data, i.e., automobiles, trees, and any other object that protrudes from the ground plane. Any groups of points from the previous step that have too few points are discarded (i.e., points that are too few to be a roof). The remaining points are considered to belong to the roof of buildings.

At step 308, portions of the segmented roof points are grouped into local planes. Within these local regions of the point cloud, a planar patch is fit to a local neighborhood of points. A covariance matrix is used to compute the local anisotropy of each point's neighborhood such that the eigenvalues of the matrix (i.e., the two most dominant eigenvectors) define the local plane. The local planes are determined throughout the segmented roof points in the point cloud.

At step 310, global plane grouping is performed to group the local planes to define the planes of the roof structure. For each local planar patch determined in step 308, a normal to the plane is computed. All of the local planes having substantially parallel normals are deemed to constitute a single plane.

At step 312, the method 300 defines the boundaries of the planes that constitute a roof structure using a ball-pivoting algorithm across the local patches that constitute each plane. The result is a set of polygons, where each polygon represents one face of a roof structure.

At step 314, the method 300 infers the topology of the roof using a topology graph. A topology graph, as discussed in more detail below, contains nodes (vertices) that represent the polygons (planar faces of a roof structure), which are interconnected to represent adjacency of particular polygons.

More specifically, the method 300 identifies the different parametric shapes that can be combined to form the roof structure. Given any roof composed of planar faces, the method 300 describes the relationship between the various faces using a topological graph data structure as described below.

1. Each face of the roof is represented by a vertex in the topological graph.
2. Two vertices of the graph have an edge between them if the corresponding polygons are adjacent (they share a physical edge).

The edges of the graph are labeled as orthogonal (O) or symmetric (S) depending on the normals of the polygons as follows:

1. $O^+$: The polygons corresponding to the end vertices have normals that, when projected to the X-Y plane, are orthogonal and point away from each other.

2. O⁻: The polygons corresponding to the end vertices have normals that, when projected to the X-Y plane, are orthogonal and point towards each other.
3. S⁺: The polygons corresponding to the end vertices have normals that, when projected to the X-Y plane, are parallel and point away from each other.
4. S⁻: The polygons corresponding to the end vertices have normals that, when projected to the X-Y plane, are parallel and point towards each other.
5. N: No constraint.

Figure 4:
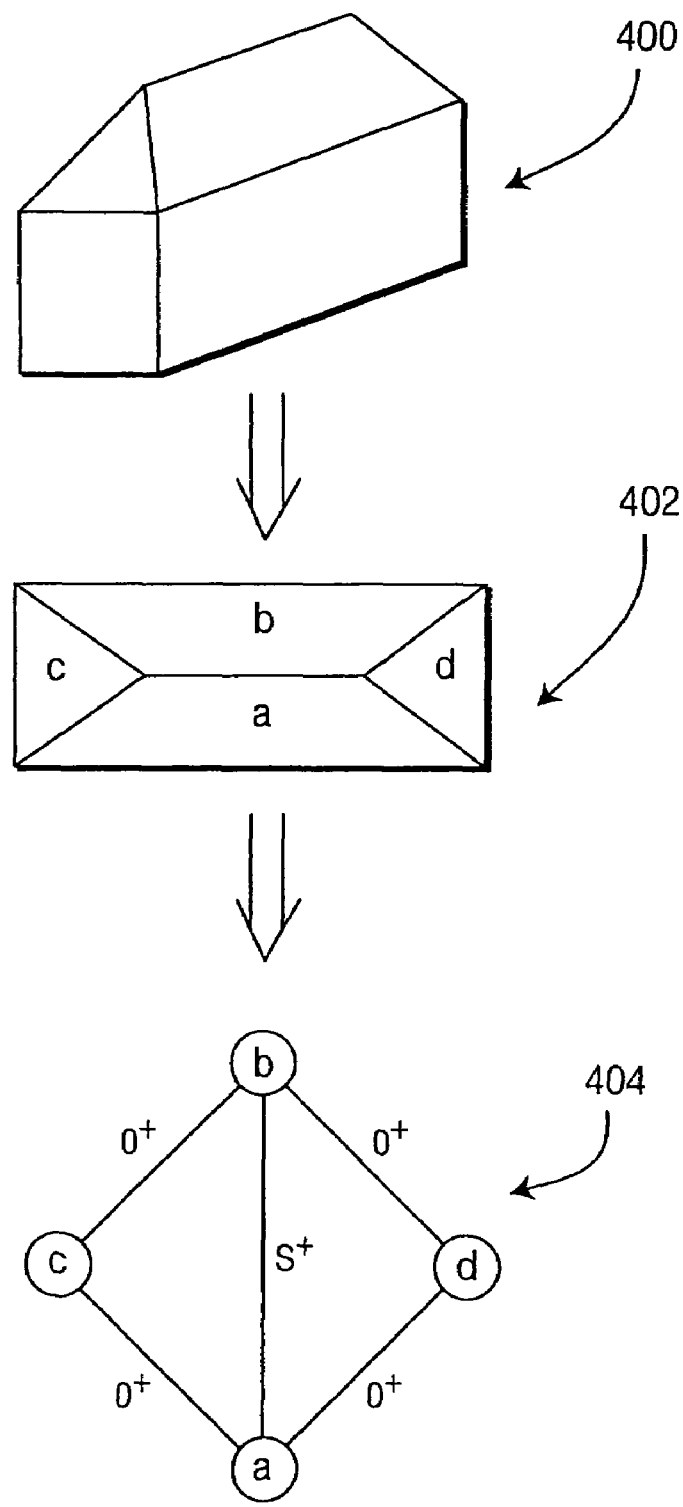
FIG. 4 depicts an example of a parametric shape for a simple rooftop and a corresponding topological graph.

FIG. 4 depicts a building 400 having a simple roof (a hip roof) 402 that is represented by four planes (polygonal faces) a, b, c, d. The roof 402 can be represented by a corresponding topological graph 404 that describes the relationships between the four faces a, b, c, d of the roof 402. In the topological graph 404, each face a, b, c, d forms a vertex and the vertices are interconnected when two faces are adjacent. These interconnections (edges of the graph) are labeled as orthogonal or symmetric as described above.

Figure 5:
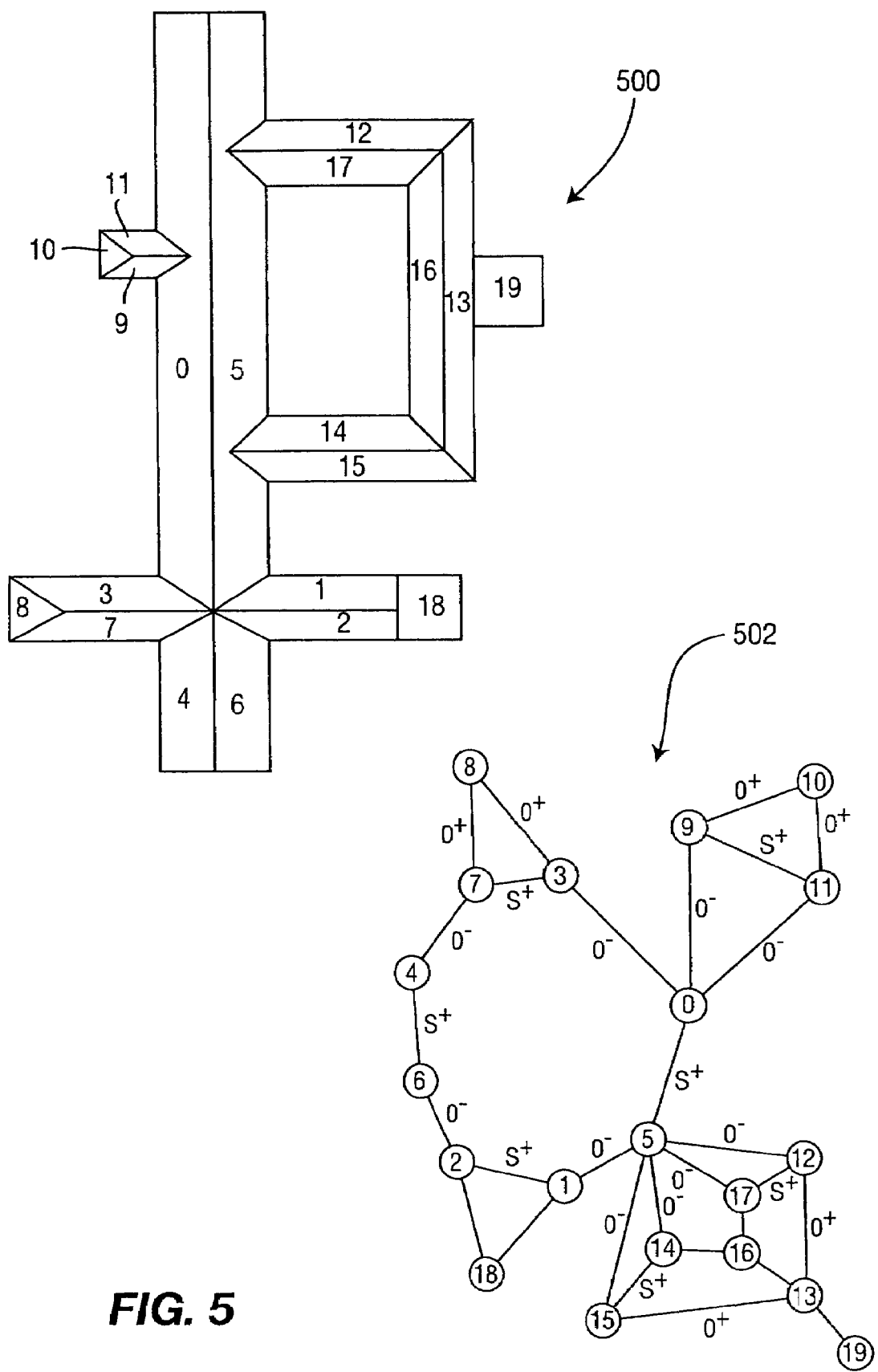
FIG. 5 depicts an example of a parametric shape for a complex rooftop and a corresponding topological graph.

More complex roof structures can similarly be analyzed to determine their topological graphs. FIG. 5 shows a complex roof 500 and a corresponding topological graph 502.

Figure 6:
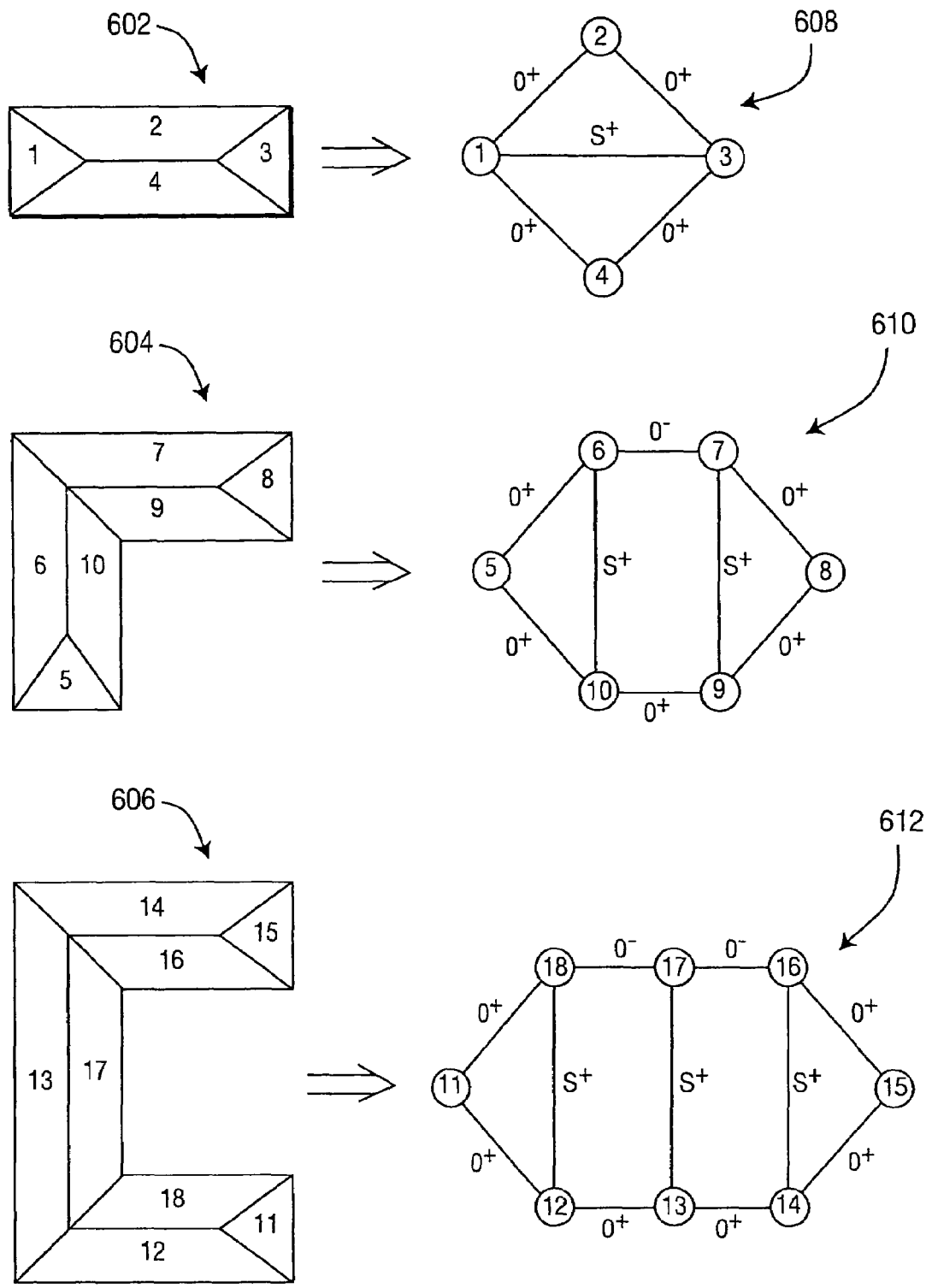
FIG. 6 depicts examples of component parametric shapes that can be combined to create complex rooftops.

A complex roof structure can be analyzed as an assembly of component roof structures. FIG. 6 depicts a sampling of these component roof structures 600, 602, 604 and their respective topological graphs 606, 608, 610. A database is maintained for these component structures such that complex roofs can be rapidly analyzed as composed of these component structures. For example, through analysis of the complex topological graph 502, certain vertex and edge combinations that form sub-graphs become apparent. The complex topological graph can be analyzed to identify sub-graphs (using sub-graph matching) that correspond to the component structures. As a result, a complex roof structure can be modeled as a combination of multiple simple roof structures.

Returning to FIG. 3, at step 316, the method 300 uses the topology graphs as constraints for searching a database for prismatic shapes that fit the topology graphs or sub-graphs. At step 318, the method 300 searches the shape database for parametric object(s) that fit the topology graph or sub-graph. At step 320, the parametric objects that fit the topology graph or sub-graphs are fit to the LIDAR data and used as the roof model. To fit the shape to the data, the local patch normals are projected onto the ground plane, a histogram of all the directions of these projections are analyzed to find a peak that defines the dominant orientation of the building. The selected roof structure shape can be aligned along this dominant orientation. The parameters of the prismatic shapes that model the roof structures are estimated such that the distance between the roof points in the point cloud and the surface of the prismatic shapes are minimized.

Given a prismatic shape and the corresponding points from the segmented roof, plane equations are setup according to the constraints defined by the prismatic shape. For example, the two planes in a gable roof are constrained to be symmetric and for a hip roof planes on opposite sides are symmetric, while planes on adjacent sides are such that the projection of their normals on the XY-plane are orthogonal. Using the plane equations with constraints, the plane parameters are estimated by minimizing the distance of the points from the planes. A well-known RANSAC algorithm is used to best fit the constrained planes to the data. The edge of the roof is defined by a single parameter and is estimated in conjunction with estimating the constrained plane parameters.

Once the roof shapes are estimated, they can be manipulated to better fit the LIDAR data if needed. Since the roofs are composed of prismatic shapes that are specified using very few parameters, the roof shapes can be altered by directly modifying the parameter values of these prismatic shapes. A user interface is provided in the form of handles on the parametric shapes that can be dragged to alter the shape. To facilitate adjusting the model, the modeling system provides a simultaneous display of the input LIDAR data and the model such that the model can be edited using the LIDAR data as a reference. With the model (in translucent or outline form) laid over the LIDAR data, a user can quickly understand where the model is not accurately representing the data.

The parametric shapes used to model the rooftops can also be edited with relative ease in cases where the automatic algorithm is not completely successful. It is assumed that, for the outdoor model, the LIDAR point cloud is representative of a building structure from an aerial view where building side structures are not available (or incomplete). The benefit of representing buildings as a combination of parametric shapes is that each building can be described by only a few parameters. For example, a rectangular box shaped building can be described by three parameters: length, width, and height; while a gable roof building can be described by at most five parameters (length, width, height, and two slopes). Another advantage to representing buildings as parametric shapes rather than groups of polygons is that the parametric shapes can be edited intuitively by operations such as push a wall, change the height, change the slope of the gable roof, and the like.

As discussed above with reference to FIG. 2, adding the ground, building sides and texture, completes the model. More specifically, once the roofs are defined, the ground surface is added to the model as a triangulated mesh that matches the ground points of the LIDAR data. The ground points, as identified from the LIDAR data earlier, are smoothened using a morphological operator. The smoothened ground points are then triangulated using the well-known Delauney triangulation algorithm to obtain a triangulated mesh. The edges of the roof structures are extruded to the ground to define the sides of the buildings. Photographic or synthetic texture can be added to the roof structures, building sides and ground to create a realistic view of the model. Various well-known texturing techniques can be used.

Indoor Modelling Component 186

Figure 7:
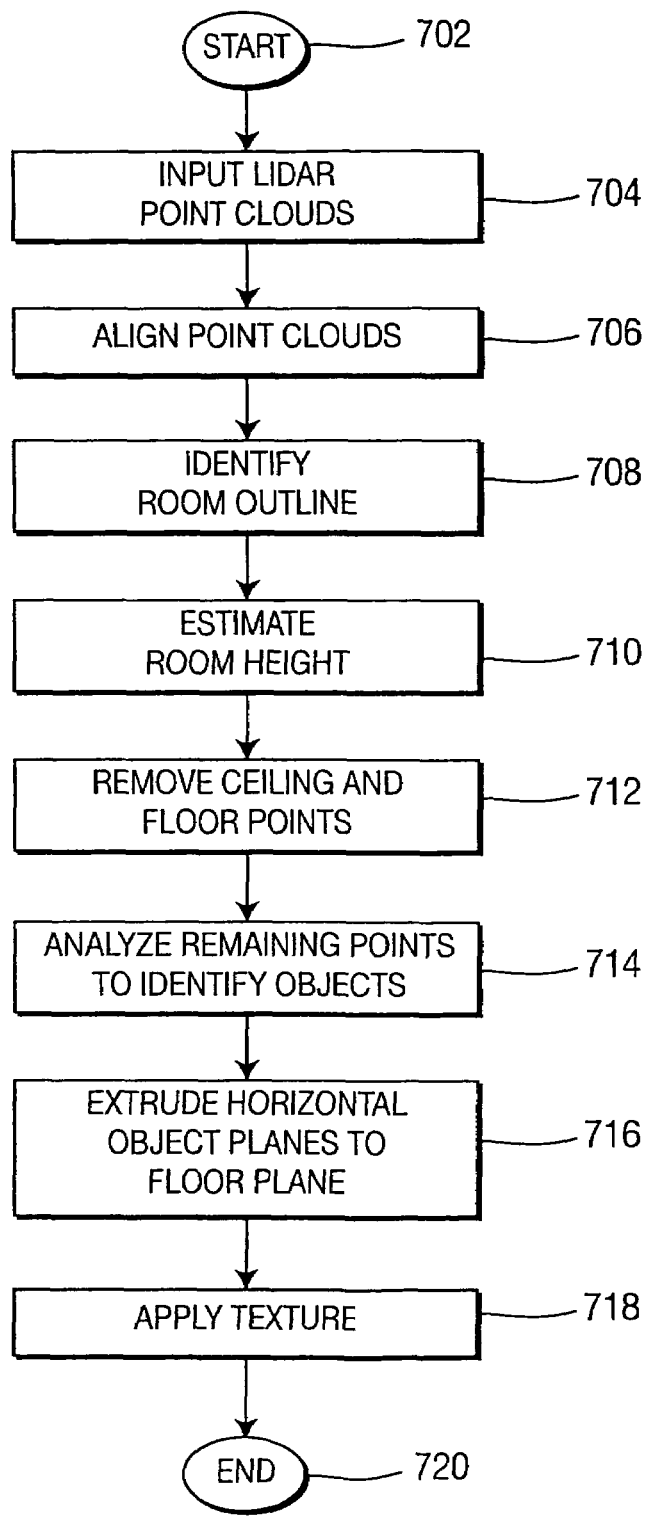
FIG. 7 depicts a flow diagram of a method of modeling a three-dimensional indoor scene.

An indoor model of a scene is created in a similar manner to that used for outdoor scenes. LIDAR data is collected for an indoor area, the LIDAR data is processed to determine planar structures in the data, these planar structures are represented with planes and/or parametric shapes and texture is added to the planes/shapes to create a realistic model of an indoor area. However, modeling indoor areas create a few issues that must be handled differently than outdoor areas. Thus, the general outdoor modeling method 200 of FIG. 2 is modified to accommodate the additional constraints of an indoor model. FIG. 7 depicts a flow diagram of a method 700 for creating three-dimensional models from LIDAR point cloud data. The method 700 begins are step 702 and proceeds to step 704, where LIDAR point cloud data is input to the method 700.

Creating models of indoor scenes is complicated by the need to combine multiple LIDAR scans having different reference coordinate systems. The LIDAR data for outdoor scenes is typically geo-referenced to the Global Positioning System (GPS) (or other position determination system) and doesn't need to be aligned to either a world coordinate system or to another overlapping LIDAR data set. However, the indoor LIDAR data is created in a local coordinate system defined with respect to the indoor LIDAR scanner used to create the data. Typically, because of occlusions, a room requires a scanner to be positioned in multiple locations to completely scan the room. Thus, multiple overlapping LIDAR scans are needed to create point cloud datasets that fully represent a room. Since each scan has its own local coordinate system, these scans need to be aligned and merged prior to be used by the modeling method to produce a model.

Figure 8:
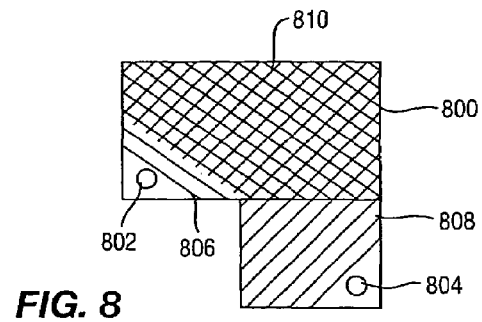
FIG. 8 depicts a room having two LIDAR scanners and the respective scan patterns of the scanners.

For example, FIG. 8 depicts a room 800 containing two scanner positions 802, 804. Scanner position 802 cover regions 806 and 810, and scanner position 804 covers regions 808 and 810. Region 810 forms a region of overlap between the two scans. Generally, when performing LIDAR scans of an indoor area, the scanners are positioned at the same vertical height such that the scanners lie in a horizontal plane. Such physical scanner alignment reduces the complexity of the alignment computation.

Returning to FIG. 7, at step 706, the point clouds created by the various scans are aligned. To align the scans, one scan is selected to be the reference data set. A minimum of three point correspondences are then identified to initialize the alignment algorithm. An iterative closest points (ICP) algorithm is used to create a transformation to align the scans. If the LIDAR scanners were physically positioned in the room at different locations, but the same level (vertical height), then the transformation comprises a rotation and a translation of the data. The LIDAR point cloud data can also be aligned to an existing floor plan or architectural drawing, if available. Such alignment to the "physical world" is useful when multiple rooms in a facility are being modeled. In a multiple room model using a floor plan as a reference, overlapping point cloud data may not be available for room-to-room alignment. As such, the floor plan forms the geo-reference for the point cloud data.

At step 708, the method 700 identifies the room outline from an orthographic plan view of LIDAR point cloud. Such outline information is easily extracted from the boundaries of the LIDAR data. Since a room may have doors or windows that will enable the LIDAR data to extend beyond the actual wall of the room, the point cloud must be processed to determine the primary boundaries and then exclude the "outlier" points that are collected beyond the boundary.

At step 710, the method 700 estimates the height of the room. A RANSAC algorithm is used to determine the top and bottom planes of the ceiling and floor of the room. If the ceiling or floor have two levels (e.g., a loft in the ceiling), then the highest and lowest planes are considered the ceiling and floor of the room. The distance between these planes is deemed the room height.

At step 712, to identify objects that are within the room, the ceiling points and the floor points are removed from the point cloud, i.e., the points that lie in the ceiling and floor planes are removed. At step 714, the remaining points are analyzed to determine the planes that form objects, e.g., furniture. The process may use steps 204, 206, and 208 of FIG. 2, where an outline of the furniture in the plan view is used to estimate the geometry for the furniture. Alternatively, the process may use steps 308, 310, and 312 of FIG. 3, where local patches identify neighboring points that lie in common planes, the patches are grouped into global groupings, and the groupings are applied to a ball-pivoting algorithm to define the boundaries of each plane.

In one embodiment of the invention, the method 700, at step 716, identifies the horizontal planes of each object, and then extrudes each of these horizontal planes to a reference plane, e.g., the floor plane. This technique creates a rudimentary model of furniture (i.e., a "stone" chair look). In an alternative embodiment, parametric objects may be used to model various objects in the scene. As described with respect to FIG. 3, topology graphs are generated to represent the various planes of the objects and their interconnections. These topology graphs may be applied to a database of parametric objects that can be selected and used in the model. The shapes may be three-dimensional shapes, e.g., a chair, table, couch, and the like, or the shape may be the horizontal planes of an object that will be extruded to the reference plane. Fit adjustment can be performed in the same manner that the roof structure models are fit to the point clouds, i.e., viewing an overlay of the model onto the point cloud data, the user can adjust the parameters of the parametric shapes to achieve an optimal fit to the data.

At step 718, photographic or synthetic texture is applied to the model to provide a realistic view of the room. The method 700 ends at step 720.

If doors exist between rooms in a facility, then portions of the LIDAR point cloud data from neighboring rooms extends into a neighboring room and will overlap. The location of the doorway is represented in the data as an aperture through the room boundary. In one embodiment of the invention, the doorway is modeled as an aperture in a wall of one room, and then the aperture is extruded into the wall of the neighboring room. It is assumed that the two rooms were modeled independently using the above steps after the LIDAR data for the two rooms was aligned in step 706 of method 700. Using this technique, the LIDAR point cloud data does not require alignment; the aperture in one room is used to form the aperture in the next room without regard to the overlapping data in the next room.

Some LIDAR scanners also a record intensity or color of scanned surfaces. Such intensity/color can be used as texture within the model. Because the intensity/color values are aligned with three-dimensional information within the LIDAR point cloud, no calibration or registration of this intensity/color information to the model is necessary. These values can be directly used to texture the models.

The invention is useful in rapidly modeling indoor and/or outdoor scenes that are represented by a LIDAR point cloud. Such modeling is useful in the creation of video game scenes, modeling of surveillance areas, training environments, and any other application where a realistic computer model of a scene is needed.

While the foregoing is directed to embodiments of the present invention, other and further embodiments of the invention may be devised without departing from the basic scope thereof, and the scope thereof is determined by the claims that follow.

The invention claimed is:

1. A method for generating a three-dimensional model of a roof structure within a target scene, comprising the steps of:
   identifying a point cloud data set corresponding to the target scene;
   removing from the point cloud data set data points corresponding to a ground portion thereby generating a refined point cloud data set;
   identifying, by a computer, one or more planar regions from within the refined point cloud data set;
   grouping the one or more planar regions into one or more local planes;
   grouping the one or more local planes into one or more roof structure planes, thereby creating one or more polygons, wherein the one or more polygons correspond to a face of the one or more roof structure planes;
   creating a topology graph of the roof portion, comprising one or more nodes, wherein each node represents one of the one or more polygons;

identifying one or more parametric shapes corresponding to the topology graph; and generating a three-dimensional model of the roof structure within the target scene based on the one or more parametric shapes.

2. The method of claim 1, wherein the step of removing data points corresponding to the ground portion further comprises:

identifying non-planar points from the point cloud data set, removing non-planar points from the point cloud data set thereby creating a planar point cloud data set, identifying a plane including the largest number of data points from the planar point cloud data set, wherein said plane comprises the ground portion, and removing data points corresponding to the plane with the largest number of data points from the planar point cloud data set, thereby creating the refined point cloud data set.

3. The method of claim 1, wherein the step of grouping the one or more planar regions into one or more local planes further comprises:

calculating a covariance matrix of two or more data points from within the one or more planar regions, and grouping the two or more data points from within the one or more planar regions into local planes based on eigenvalues of the covariance matrix, thereby creating one or more local planes.

4. The method of claim 1, wherein the step of grouping the one or more local planes to define one or more roof structure planes further comprises:

calculating a normal for each of the one or more local planes, and grouping together the one or more local planes having substantially parallel normals, thereby defining one or more roof structure planes.

5. The method of claim 1, wherein the step of grouping the one or more local planes into one or more roof structure planes, thereby creating one or more polygons utilizes a ball pivoting algorithm in order to define the boundaries of the one or more local planes.

6. The method of claim 1, wherein the topology graph is represented by two or more topological graphs.

7. The method of claim 1, wherein the step of identifying one or more parametric shapes corresponding to the topology graph further comprises searching a parametric shapes database for parametric shapes which correspond to the topology graph.

* * * * *